(12) United States Patent
Kawai

(10) Patent No.: US 11,939,068 B2
(45) Date of Patent: Mar. 26, 2024

(54) HYBRID FLIGHT VEHICLE

(71) Applicant: Honda Motor Co., Ltd., Tokyo (JP)

(72) Inventor: Keisuke Kawai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1191 days.

(21) Appl. No.: 16/660,552

(22) Filed: Oct. 22, 2019

(65) Prior Publication Data
US 2020/0148376 A1  May 14, 2020

(30) Foreign Application Priority Data

Nov. 2, 2018 (JP) .................................. 2018-206994

(51) Int. Cl.
*B64D 27/24* (2006.01)
*B60L 58/00* (2019.01)
(Continued)

(52) U.S. Cl.
CPC ............ *B64D 27/24* (2013.01); *B64C 39/024* (2013.01); *B64D 27/10* (2013.01); *B64U 50/33* (2023.01);
(Continued)

(58) Field of Classification Search
CPC .. B64D 27/24; B64D 35/04; B64D 2027/026; B64D 50/33; B64D 31/06; B64C 39/024;
(Continued)

(56) References Cited

U.S. PATENT DOCUMENTS 6,647,326 B2 * 11/2003 Nakamori .............. B60K 6/547
  477/158
6,913,558 B2 * 7/2005 Mori ..................... B60W 10/06
  477/3
(Continued)

FOREIGN PATENT DOCUMENTS

CN          107074367 A      8/2017
JP        2010101210 A   *  5/2010
(Continued)

OTHER PUBLICATIONS

English translation of JP-2010101210 (Year: 2010).*
(Continued)

*Primary Examiner* — Nicholas McFall
*Assistant Examiner* — Marisa V Conlon
(74) *Attorney, Agent, or Firm* — Duft & Bornsen, PC

(57) ABSTRACT

In a hybrid flight vehicle, having multiple rotors attached to a frame, a gas turbine engine to drive the rotors; a generator connected to the gas engine to generate electric power, a battery store the electrical power generated by the generator. multiple first electric motors connected to the rotors to drive the same by the electric power supplied from the battery, a second electric motor connected to the gas turbine engine to motor the engine by the electric power supplied from the battery and a control unit to control flight, wherein the control unit stops supply of the fuel to the engine when a detected residual of the battery is equal to or greater than a predetermined value, and supplies electric power to the (Continued)

second electric motor to motor the engine when a detected temperature of the engine is equal to or higher than a predetermined temperature.

10 Claims, 7 Drawing Sheets

(51) Int. Cl.
| | |
|---|---|
| B64C 39/02 | (2023.01) |
| B64D 27/10 | (2006.01) |
| B64D 31/06 | (2006.01) |
| B64U 10/13 | (2023.01) |
| B64U 10/14 | (2023.01) |
| B64U 50/12 | (2023.01) |
| B64U 50/19 | (2023.01) |
| B64U 50/33 | (2023.01) |
| F02C 9/00 | (2006.01) |
| B64U 30/20 | (2023.01) |
| B64U 50/13 | (2023.01) |
| B64U 50/34 | (2023.01) |

(52) U.S. Cl.
CPC .............. *B60L 58/00* (2019.02); *B64D 31/06* (2013.01); *B64U 10/13* (2023.01); *B64U 10/14* (2023.01); *B64U 30/20* (2023.01); *B64U 50/12* (2023.01); *B64U 50/13* (2023.01); *B64U 50/19* (2023.01); *B64U 50/34* (2023.01); *B64U 2201/10* (2023.01); *F02C 9/00* (2013.01)

(58) Field of Classification Search
CPC ........ B64U 50/13; B64U 50/14; B64U 50/19; B64U 2201/10; B64U 2201/20; B64U 10/10
See application file for complete search history.

(56) References Cited

U.S. PATENT DOCUMENTS

| | | | | |
|---|---|---|---|---|
| 7,527,030 | B2 * | 5/2009 | Fukushima | ............ B60W 10/06 290/34 |
| 8,128,019 | B2 * | 3/2012 | Annati | ................... B64D 27/24 244/12.3 |
| 2017/0320584 | A1 * | 11/2017 | Menheere | ............... F02C 7/275 |

FOREIGN PATENT DOCUMENTS

| | | |
|---|---|---|
| JP | 2010101210 A | 5/2010 |
| JP | 2010137844 A | 6/2010 |
| JP | 2016088111 A | 5/2016 |
| WO | WO-2015029650 A1 * | 3/2015 ............. B60K 6/387 |

OTHER PUBLICATIONS

English translation of WO-2015029650 (Year: 2015).*
Chinese Office action; Application 201911047281.5; dated Nov. 2, 2022.
Japanese Office action; Application 2018-206994; dated Nov. 9, 2021.

* cited by examiner

HYBRID FLIGHT VEHICLE

CROSS-REFERENCE TO RELATED APPLICATION

This application is based upon and claims the benefit of priority from Japanese Patent Application No. 2018-206994 filed on Nov. 2, 2018, the contents of which are incorporated herein by reference.

BACKGROUND OF THE INVENTION

Field of the Invention

This invention relates to a hybrid flight vehicle and more particularly to a parallel hybrid flight vehicle capable of vertical take-off and landing that is equipped with multiple rotors driven by either or both of a gas turbine engine and a set of electric motors supplied power from a generator driven by the gas turbine engine.

Technology related to the aforesaid hybrid flight vehicle can be found, for example, in Japanese Unexamined Patent Application No. 2010-137844. Technology of the type concerned is configured with an eye to improving fuel efficiency by, for example, stopping the gas turbine engine at a stage when amount of generated electricity from the gas turbine engine and charged in a battery reaches upper limit value.

Although a configuration like that described in the above-mentioned reference is aimed at enhancing fuel consumption efficiency, it runs a risk of degrading durability of stator vanes, moving vanes and the like at the combustion chamber outlet when engine temperature becomes excessively high upon the once stopped gas turbine engine being immediately emergency-restarted for some reason (due to battery failure, for example), particularly when the restarting of the gas turbine engine is performed in an overheated state, such as under high temperature external air conditions during summer.

In addition, engine starting performance is likely to decline when lubricating oil viscosity deteriorates owing to the gas turbine engine being out of operation for a long time, especially when lubricant temperature falls low owing to ice over during winter.

SUMMARY OF THE INVENTION

An object of this invention is therefore to resolve the aforesaid disadvantages by, as regards a hybrid flight vehicle equipped with rotors driven by a gas turbine engine and electric motors, providing a hybrid flight vehicle adapted to achieve improved fuel efficiency and avoid degradation of engine durability.

In order to achieve the object, the invention provides, in its first aspect, a hybrid flight vehicle, comprising: a frame; multiple rotors attached to the frame and configured to produce propelling force to propel the frame; a gas turbine engine attached to the frame and configured to drive the rotors by combustion when fuel is supplied in a combustion chamber; a generator connected to an output shaft of the gas turbine engine and configured to generate electric power; a battery configured to store the electrical power generated by the generator; multiple first electric motors each connected to the rotors to drive associated one of the rotors by the electric power supplied from the battery; a second electric motor connected to the output shaft of the gas turbine engine to motor the gas turbine engine by the electric power supplied from the battery; an engine temperature detector configured to detect a temperature of the gas turbine engine; a battery residual detector configured to detect a residual of the battery; and a control unit configured to control flight by regulating driving of the multiple rotors by either or both of the first electric motors and the gas turbine engine; wherein the control unit stops supply of the fuel to the gas turbine engine when the residual of the battery detected by the battery residual detector is equal to or greater than a predetermined value, and supplies electric power to the second electric motor from the battery to motor the gas turbine engine when the temperature of the gas turbine engine detected by the engine temperature detector is equal to or higher than a predetermined temperature.

In order to achieve the object, the invention provides, in its second aspect, a hybrid flight vehicle, comprising: a frame; multiple rotors attached to the frame and configured to produce propelling force to propel the frame; a gas turbine engine attached to the frame and configured to drive the rotors by combustion when fuel is supplied in a combustion chamber; a generator connected to an output shaft of the gas turbine engine and configured to generate electric power; a battery configured to store the electrical power generated by the generator; multiple first electric motors each connected to the rotors to drive associated one of the rotors by the electric power supplied from the battery; a second electric motor connected to the output shaft of the gas turbine engine to motor the gas turbine engine by the electric power supplied from the battery; an engine temperature detector configured to detect a temperature of the gas turbine engine; a battery residual detector configured to detect a residual of the battery; and an electronic control unit constituted of a microcomputer equipped with at least one processor and at least one memory coupled to the processor, the processor being configured to control flight by regulating driving of the multiple rotors by either or both of the first electric motors and the gas turbine engine; wherein the processor is configured to stop supply of the fuel to the gas turbine engine when the residual of the battery detected by the battery residual detector is equal to or greater than a predetermined value, and supply electric power to the second electric motor from the battery to motor the gas turbine engine when the temperature of the gas turbine engine detected by the engine temperature detector is equal to or higher than a predetermined temperature.

In order to achieve the object, the invention provides, in its third aspect, a method for controlling a hybrid flight vehicle, having: a frame; multiple rotors attached to the frame and configured to produce propelling force to propel the frame; a gas turbine engine attached to the frame and configured to drive the rotors by combustion when fuel is supplied in a combustion chamber; a generator connected to an output shaft of the gas turbine engine and configured to generate electric power; a battery configured to store the electrical power generated by the generator; multiple first electric motors each connected to the rotors to drive associated one of the rotors by the electric power supplied from the battery; and a second electric motor connected to the output shaft of the gas turbine engine to motor the gas turbine engine by the electric power supplied from the battery; the method comprising the steps of: detecting a temperature of the gas turbine engine; detecting a residual of the battery; stopping supply of the fuel to the gas turbine engine when the detected residual of the battery is equal to or greater than a predetermined value, and supplying electric power to the second electric motor from the battery to motor the gas turbine engine when the detected temperature of the gas turbine engine is equal to or higher than a predetermined temperature.

BRIEF DESCRIPTION OF THE DRAWINGS

The objects and advantages of the present invention will become clearer from the following description of embodiments in relation to the attached drawings, in which.

DETAILED DESCRIPTION OF THE INVENTION

In the following, the hybrid flight vehicle according to this invention is explained with reference to the attached drawings in the following.

Figure 1:
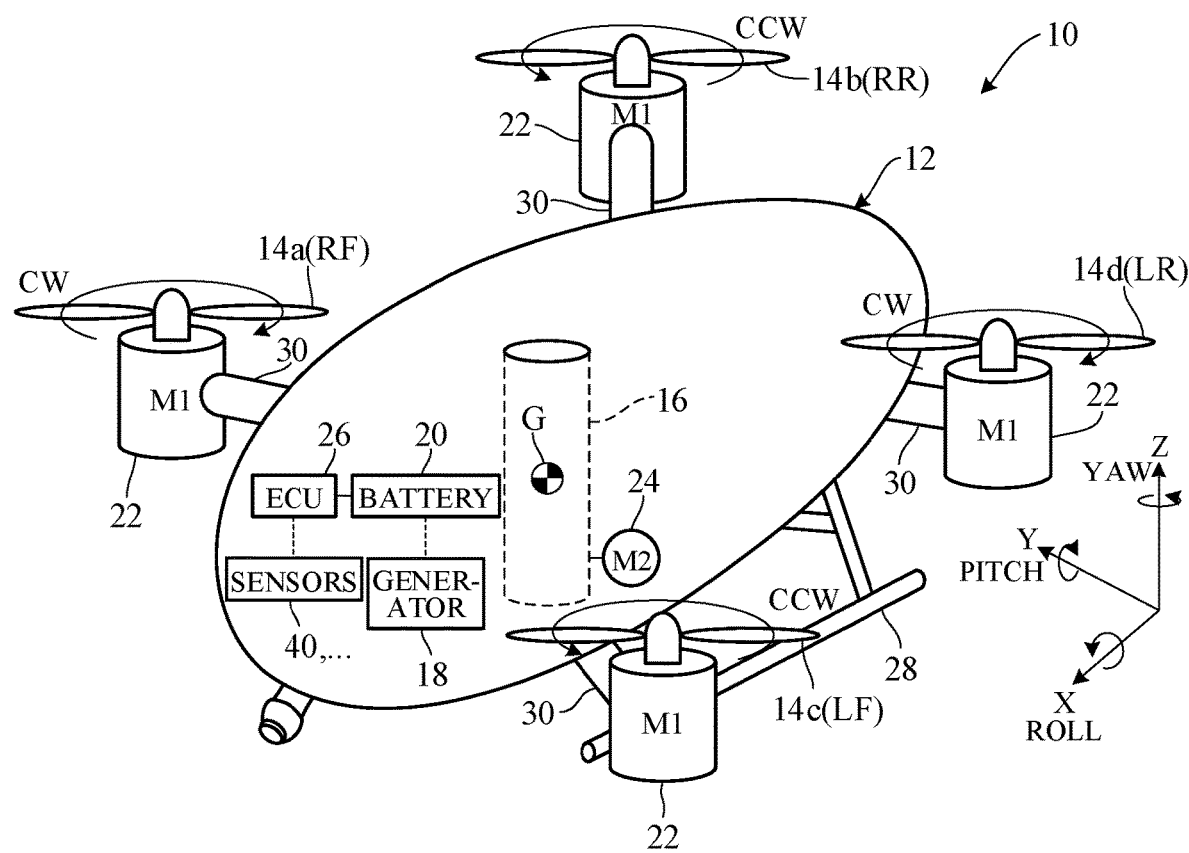
FIG. 1 is a perspective diagram showing an overview of a hybrid flight vehicle in accordance with an embodiment of this invention.
Figure 2:
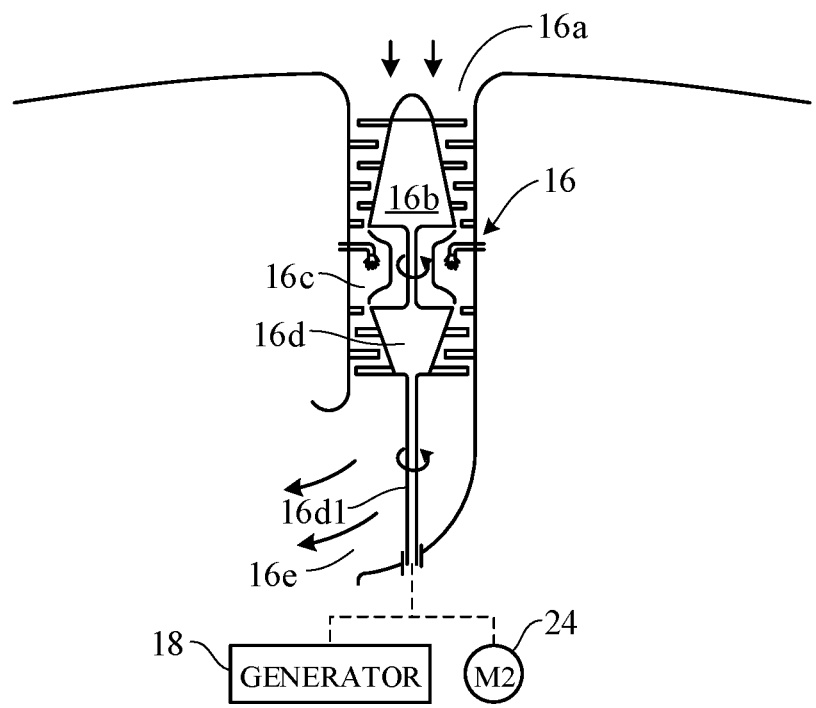
FIG. 2 is a partial side view of the hybrid flight vehicle of FIG. 1.
Figure 3:
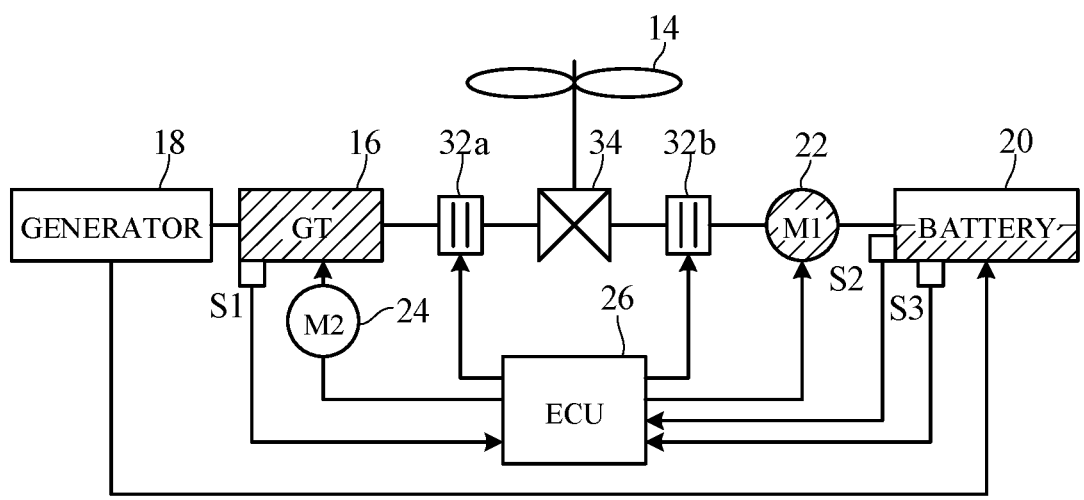
FIG. 3 is a block diagram illustrating an overall interconnection of constituent elements during parallel driving by the gas turbine engine and electric motors of the hybrid flight vehicle of FIG. 1.

FIG. 1 is a perspective diagram showing an overview of a hybrid flight vehicle in accordance with an embodiment of this invention. FIG. 2 is a partial side view of the hybrid flight vehicle of FIG. 1. FIG. 3 is a block diagram illustrating overall interconnection of constituent elements during parallel driving by the gas turbine engine and electric motors of the hybrid flight vehicle of FIG. 1.

Reference numeral 10 in FIG. 1 and other drawings designates a hybrid flight vehicle (hereinafter called simply "flight vehicle" or "vehicle"). The flight vehicle 10 is given a parallel configuration, and a configuration enabling Vertical Take-Off and Landing, that comprises a frame (fuselage) 12, multiple rotors 14 attached to the frame and configured to produce propelling force to propel the frame 12 (flight vehicle 10), a gas turbine engine (GT) 16 attached to the frame 12 and configured to drive the rotors 14, a generator 18 connected to an output shaft of the GT 16 and configured to generate electric power, a battery 20 for storing electrical energy generated by the generator 18, a group of first electric motors 22 (hereinafter sometimes called simply "motors" and designated "M1" in the drawings) capable of driving the rotors 14 using power supplied from the battery 20, a second motor 24 (designated "M2" in the drawings) connected to the output shaft of the GT 16 and configured to drive the GT 16 using power supplied from the battery 20, and a control unit 26 (electronic control unit, hereinafter called "ECU") configured to control flight by regulating driving of the multiple rotors 14 by either or both of the motors 22 and the GT 16. Landing gear 28 is attached to bottom of the frame 12.

The GT 16 and other members are housed inside the frame 12. Although the flight vehicle 10 is not built to carry a passenger, it can be modified to a manned type vehicle by installing a passenger seat on the frame 12.

The multiple rotors (fans, propellers) 14 include 2 n (n≥2) rotor units attached through attachment shafts 30 in a radial pattern in top view of the frame 12, actually 4 units comprising a right front (RF) unit 14a, a right rear (RR) unit 14b, a left front (LF) unit 14c and a left rear LR unit 14d.

Each rotor 14 has a rotational axis lying parallel to yaw axis (Z axis; gravity axis) and is configured as a single-blade fixed pitch propeller of known shape. The number (n) of rotors 14 of the flight vehicle 10 is not limited to n=2 (quadcopter) but can instead be n=3 (hexacopter), n=4 (octacopter), or the like.

Figure 4:
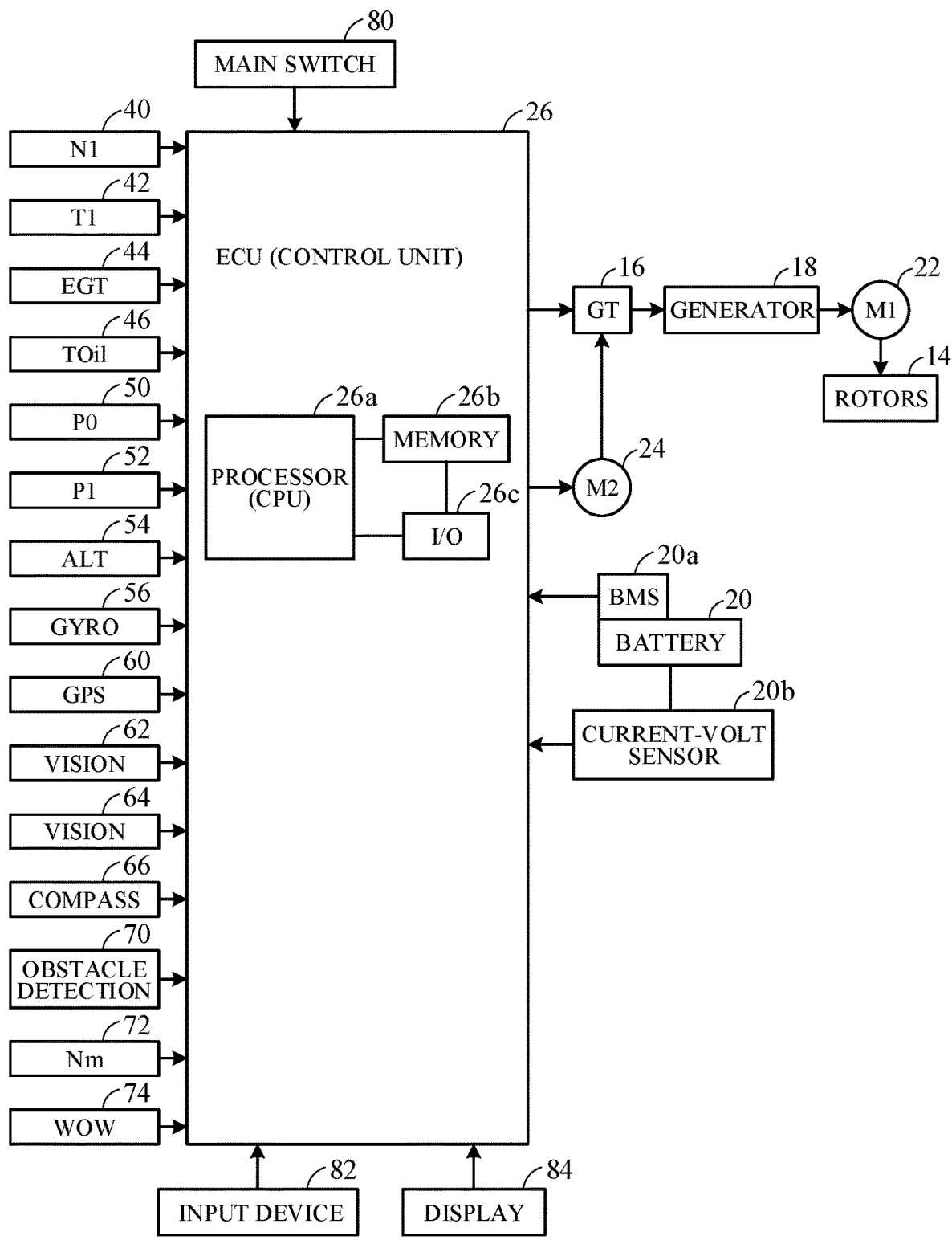
FIG. 4 is a block diagram focused on a control unit (ECU) shown in FIG. 3 (and other figures) and various sensors.

The aforesaid motors (M1) 22 are installed at bases of the associated four rotors 14, and a configuration is adopted whereby the rotors 14 can be driven by the motors 22 and also be driven by the GT 16. Namely, as illustrated in FIGS. 3 and 4, the GT 16 and motors 22 are connected through electromagnetic clutches 32a and 32b to a gearbox 34 by which rotation of rotating shafts (not shown) of the motors 22 and GT 16 is inputted to the four rotors 14.

Figure 7:
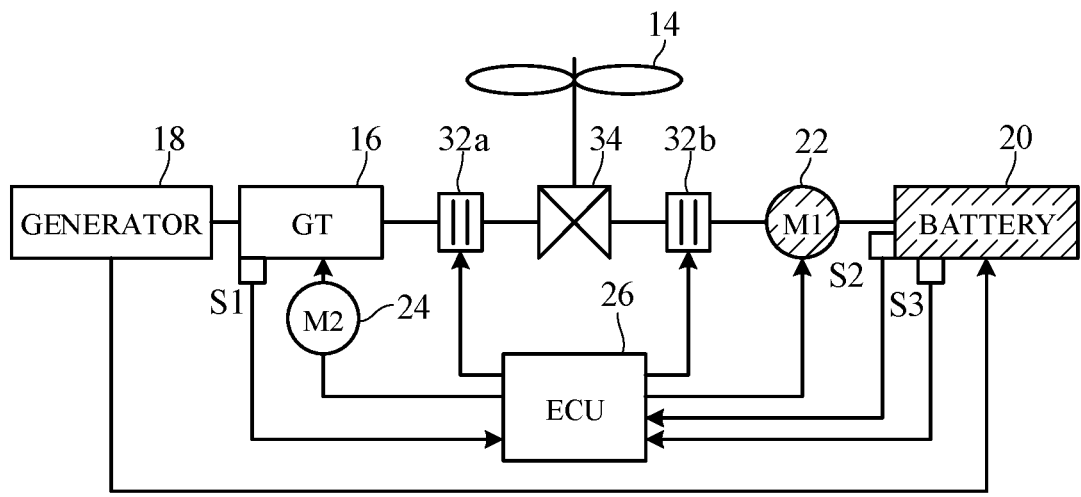
FIG. 7 is a block diagram, similar to FIG. 3, but showing processing of FIG. 6.

The four rotors 14 are adapted to maintain horizontal posture (attitude) of the flight vehicle 10 by, for example, rotating one set of rotors 14a and 14d in one direction, e.g., clockwise (CW), and rotating another set of rotors 14b and 14c in opposite (counterclockwise (CCW)) direction. During parallel driving by the GT 16 and motors 22 as shown in FIG. 3, composite torques of the GT 16 and the motors 22 are transmitted to the associated four rotors 14, while during series driving solely by the motors 22 as shown in FIG. 7 discussed later, only torques of the motors 22 are transmitted to the associated four rotors 14.

The GT 16 is a conventional turboshaft engine, like that shown in FIG. 2, having a single-spool structure comprising a compressor 16b including fan rotor blades and stator blades for compressing therebetween intake air sucked in through an air intake port 16a opened in the frame 12, a combustion chamber 16c installed downstream thereof, and a turbine 16d connected to the compressor 16b to rotate integrally therewith. Illustration of a frame 12 side opening of a compressed intake air exhaust port 16e is omitted in FIGS. 1 and 2.

An output shaft 16d1 of the turbine 16d (turbine output shaft, i.e., GT 16 output shaft) is connected to the generator 18 through an appropriate speed reducer mechanism (not shown) in order to drive the generator 18. The generator 18 driven by the turbine 16d generates electric power (AC power). Power generated by the generator 18 is converted to DC power by a converter of a PDU (Power Drive Unit; not shown) and stored in the battery 20.

The turbine output shaft 16d1 is also connected to the second motor 24 in a configuration whereby the GT 16 is rotated (motored (idled)) by the second motor 24 when fuel supply is terminated. As illustrated, the output shaft of the GT 16 (the turbine output shaft 16d1) is attached to lie parallel to yaw axis (Z axis) of the frame 12.

The battery 20 is connected to the motors 22. Specifically, power discharged from the battery 20 and converted to AC through the PDU inverter is supplied as AC power to the four motors 22 installed one on each of the four rotors 14. The motors 22 are brushless DC motors rotated by sequentially supplying current to their three phase coils (not shown). Like the motors 22, the second motor 24 is also a brushless DC motor.

In the flight vehicle 10 according to the present embodiment, the GT 16 has rated power of about 100 kW, the motors 22 of about 20 kW, and the battery 20 of about 10 kW. The battery 20 incorporates a BMS (Battery Management System) 20a for self-diagnosing residual (State of Charge; SOC) (shown in FIG. 4, and also in FIG. 3 as "S2").

FIG. 4 is a block diagram focused on the ECU (control unit) 26 shown in FIG. 3 (and other figures) and various sensors.

As shown in FIG. 4, the ECU 26 is a microcomputer comprising at least one processor (CPU) 26a, at least one memory 26b (more specifically memories including ROM and RAM) coupled to the processor 26a, and an I/O unit 26c, and is installed at a suitable location as accommodated in a container.

Turning to an explanation of the various sensors, a rotational speed sensor 40 installed near the turbine output shaft 16d1 of the GT 16 outputs a signal indicating turbine rotational speed N1. A temperature sensor 42 installed near the air intake port 16a formed in the frame 12 outputs a signal indicating GT inlet temperature T1, and a second temperature sensor 44 (engine temperature detector; indicated as "S1" in FIG. 3) installed at a suitable location downstream of the combustion chamber 16c outputs a signal indicating engine temperature (exhaust gas temperature) EGT. A third temperature sensor 46 (lubricant temperature detector) installed at a suitable part of a lubricating oil supply system (not shown) outputs a signal indicating lubricant temperature Toil.

Further, a pressure sensor 50 installed inside the container housing the ECU 26 outputs a signal indicating atmospheric pressure P0 and a second pressure sensor 52 installed near the air intake port 16a outputs a signal indicating GT inlet pressure P1

Further, an altimeter (ALT) 54 installed on underside of the frame 12 produces an output indicating altitude ALT of the flight vehicle 10 using a reflected wave of a downwardly projected laser beam or the like, and a gyrosensor (GYRO) 56 installed at an appropriate location on the frame 12 produces an output indicating angle of inclination of the frame 12 relative to Z axis (yaw axis) among absolute X, Y, Z coordinate axes (shown in FIG. 1).

Moreover, a GPS receiver 60 provided at a suitable location on the frame 12 uses signals received from a group of satellites to produce an output indicating position of the flight vehicle 10. Further, a single first vision sensor (VISION) 62 attached under the frame 12 to face downwards as shown in FIG. 1 outputs forward-looking captured images, and multiple second vision sensors (VISION) 64 attached at rear and sides of the frame 12 output rearward- and sideward-looking captured images. In addition, a compass 66 provided at a suitable location on the frame 12 produces an output indicating absolute direction, and an obstacle detection sensor (OBSTACLE DETECTION) 70 is installed that uses a reflected wave of a forward projected ultrasonic signal to produce an output indicating presence/absence of an obstacle.

Further, four rotational speed sensors 72 installed one near the rotating shaft of each of the first motors 22 installed at the four rotors 14 produce outputs indicating motor rotational speeds Nm. Moreover, as pointed out earlier, the BMS 20a of the battery 20 (battery residual detector; indicated as "S2" in FIG. 3) produces an output indicating residual (SOC), and a current-volt sensor 20b (battery failure detector; indicated as "S3" in FIG. 3) installed between the battery 20 and the PDU produces an output indicating amperage and voltage of power inputted to the battery 20. In addition, a WOW (Weight-on-Wheel) sensor 74 provided on the landing gear 28 produces an output indicating landing (touchdown) when the frame 12 lands.

A main switch 80 is provided at an appropriate location on the frame 12. When an operator (user) turns the main switch 80 ON, the GT 16 is started and the CPU 26a of the ECU 26 is activated by operating power supplied from the battery 20. In addition, input device 82 and a display 84 are connected to the ECU 26.

Outputs of the aforesaid sensors are sent to the ECU 26. The ECU 26 uses these outputs to ascertain operating state of the GT 16, to control operation of the GT 16 by, inter alia, metering supply of fuel to the combustion chamber 16c so as to increase and decrease turbine rotational speed, to ascertain operating state of the battery 20, and to control flight of the flight vehicle 10 by regulating driving of the rotors 14 by the GT 16 and the motors 22. Moreover, the ECU 26 ascertains flight speed of the flight vehicle 10 from time-course change of output of the GPS receiver 60.

Figure 5:
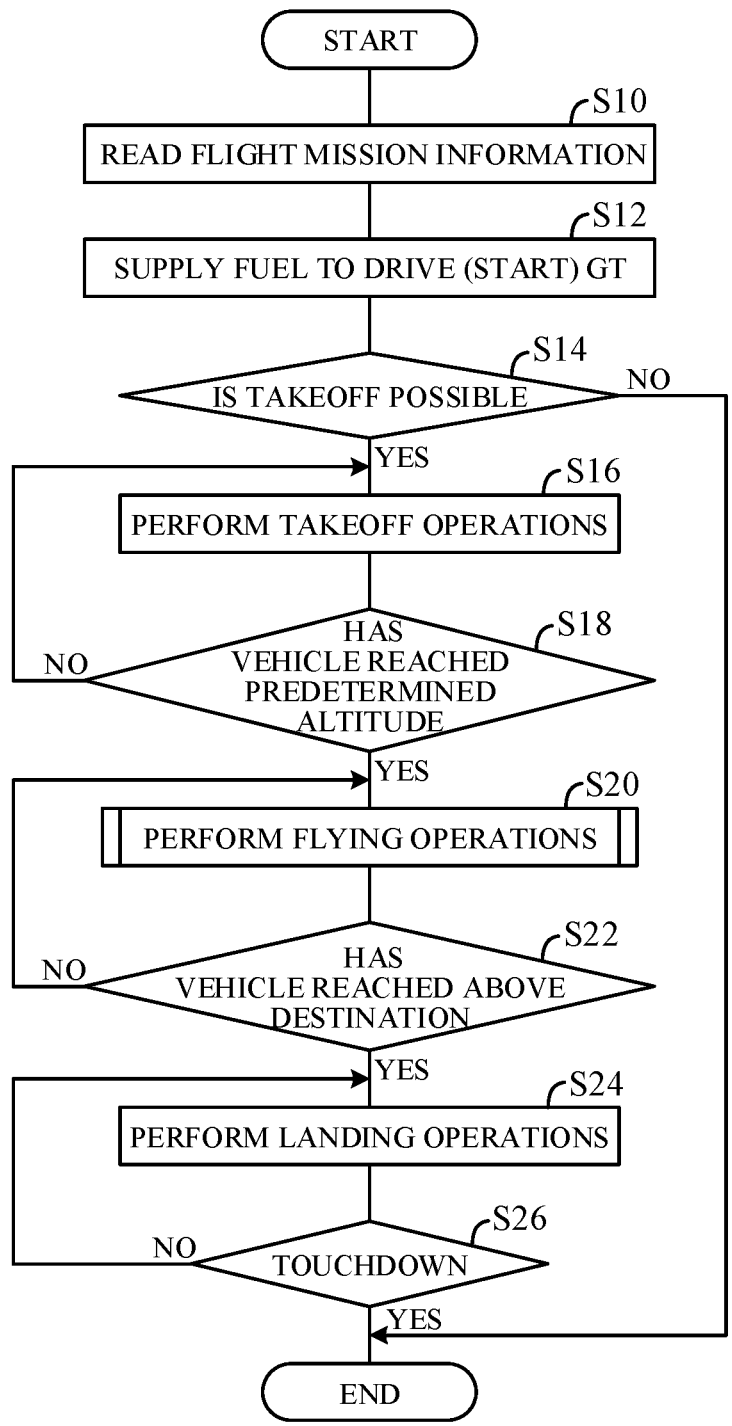
FIG. 5 is a flowchart showing processing of the control unit (ECU) of FIG. 3.
Figure 6:
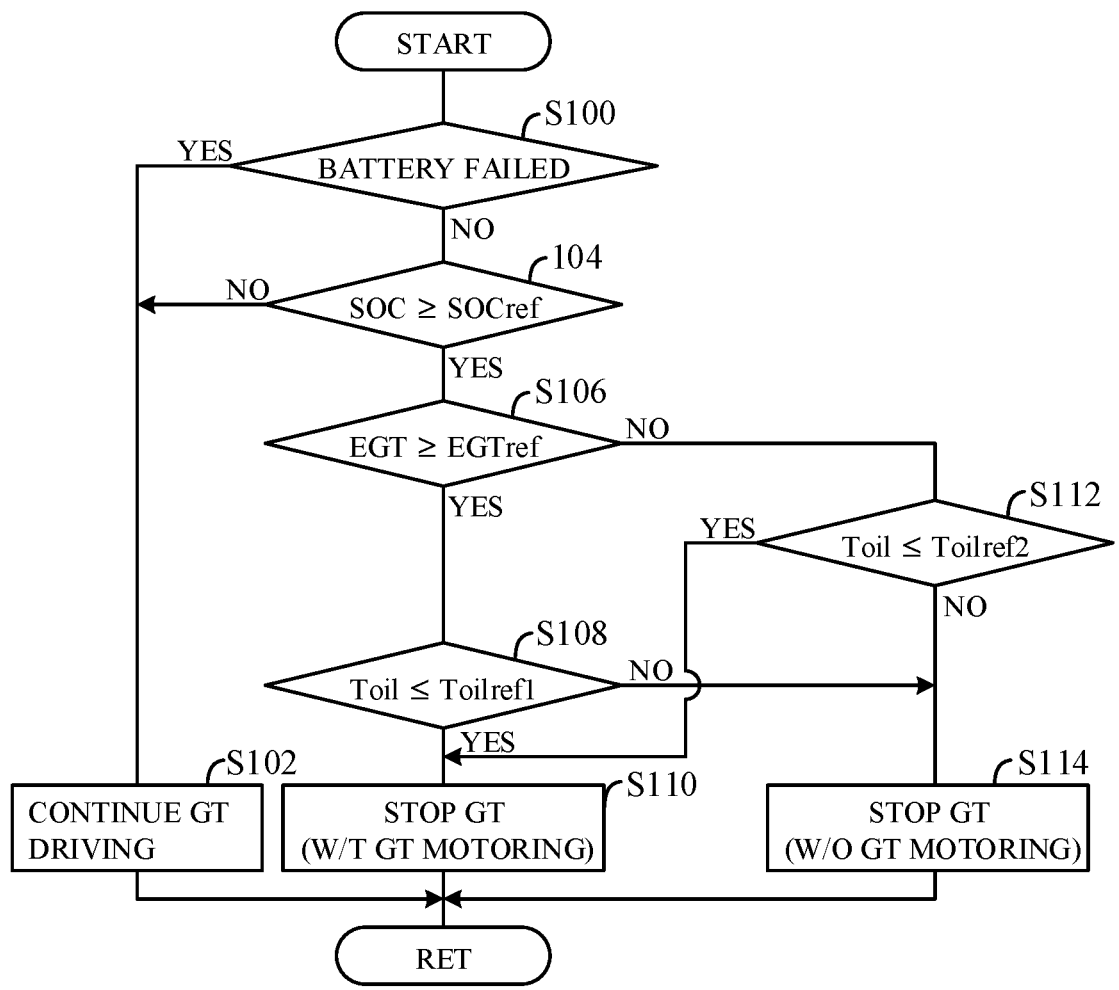
FIG. 6 is a flowchart showing processing of the control unit (ECU) of FIG. 3 in parallel with that of FIG. 5.

FIGS. 5 and 6 are flowcharts showing processing of the ECU 26, namely, operations of the flight vehicle 10 according to this embodiment. FIG. 5 is a flowchart showing control regarding normal mode flight of the flight vehicle 10, and FIG. 6 is a flowchart showing control in battery charge mode and the like during such flight.

Starting with an explanation with reference to FIG. 5, first, in S10 (S: processing Step), destination, flight course and other flight mission information inputted (instructed) by an operator through the input device 82 and display 84 is read, whereafter in S12 fuel is supplied to drive (start) the GT 16.

Next, it is determined in S14 whether takeoff is possible, and when the result is NO, the ensuing processing is skipped, and when YES, the program goes to S16, in which takeoff operations are performed.

During takeoff, the rotors 14 are rotated by rotation transmitted from the GT 16, and rotational speed of the four rotors 14 is controlled to increase evenly.

The program next goes to S18, in which it is determined based on output of the altimeter 54 whether the flight vehicle 10 has reached predetermined altitude, i.e., whether takeoff was achieved, and when the result is NO, the program returns to S16, and when YES, goes to S20, in which flying operations are performed, i.e., the frame 12 (specifically, the flight vehicle 10) is flown.

While flying toward the inputted destination, posture of the frame 12 is finely adjusted based on output of the gyrosensor 56. For example, flight direction is controlled by reducing rotational speed of the two forward rotors 14a and 14c among the four rotors 14 and increasing rotational speed the two rearward rotors 14b and 14d.

When turning, to the right for example, is to be performed, rotational speed of the two right side rotors 14a and 14b among the four rotors 14 is reduced and rotational speed of the two left side rotors 14c and 14d is increased, whereby the frame 12 is turned in desired right direction by reaction force of the rotors 14 on the side of higher rotational speed. Degree of turning is adjusted by increasing/decreasing rotational speed of the rotors 14.

In rotation control (control of rotation around yaw axis), CCW rotation of the frame 12 is performed by increasing rotational speed of the CW rotating rotors 14a and 14d among the rotors 14 and lowering rotational speed CCW rotating rotors 14b and 14c. CW rotation of the frame 12 is performed in reverse from the aforesaid.

The program next goes to S22, in which it is determined from output of the GPS receiver 60 whether a point above the destination has been reached, and when the result is NO, the program returns to S20, and when YES, goes to S24, in which landing operations are performed, i.e., the frame 12 (flight vehicle 10) goes into landing mode.

The frame 12 is landed by gradually decreasing rotational speed of all of the four rotors 14. This processing is continued until touchdown is determined from output of the WOW sensor 74 in S26.

FIG. 6 is a flowchart showing processing of the ECU 26, i.e., control in battery charge and other modes performed by the ECU 26 in parallel with the processing of FIG. 5.

Now to explain, in S100, it is determined whether the battery 20 failed. Failure of the battery 20 is determined in cases such as when output of the current-volt sensor 20b does not change over a certain time period. When the result in S100 is YES, the program goes to S102 in which GT 16 driving is continued. That is, in order to enhance flight safety, driving by GT 16 is continued even when the battery 20 fails.

On the other hand, when the result in S100 is NO, the program goes to S104 in which it is determined whether residual (SOC) of the battery 20 detected from the BMS 20a is equal to or greater than a predetermined value SOCref. This predetermined value is defined as, for example, one equivalent, or nearly equivalent, to fully charged state of the battery 20.

When the result in S104 is NO, the program goes to S102, and when YES, goes to S106 in which it is determined based on output of the second temperature sensor 44 whether engine temperature EGT of the GT 16 is equal to or higher than a predetermined temperature EGTref.

When the result in S106 is YES, the program goes to S108 in which it is determined based on output of the third temperature sensor 46 whether lubricant temperature Toil of the GT 16 is equal to or lower than a first specified temperature Toilref1, and when the result is YES, the program goes to S110 in which fuel supply to the GT 16 is stopped (i.e., the GT 16 driving (operation) is stopped), but the GT 16 is motored (idled) by driving the second motor 24.

On the other hand, when the result in S106 is NO, the program goes to S112 in which it is determined whether lubricant temperature Toil of the GT 16 is equal to or lower than a second specified temperature Toilref2, and when the result is YES, the program goes to S110 to motor the GT 16. The second specified temperature Toilref2 is defined as a value equal to or near the first specified temperature Toilref1.

On the other hand, when the result in S112 is NO, the program goes to S114 in which fuel supply to the GT 16 is stopped (i.e., the GT 16 is stopped), but is not motored (only stop but not motor the GT 16). Specifically, the GT 16 is stopped and the rotors 14 are solely driven by outputs of the motors 22 in view of the fact that it was determined in S104 that the battery 20 is fully charged and further determined in S106 that engine temperature is lower than predetermined temperature. The same applies when the result in S108 is NO, i.e., when lubricant temperature Toil of the GT 16 is determined to exceed the first specified temperature Toilref1.

Figure 8:
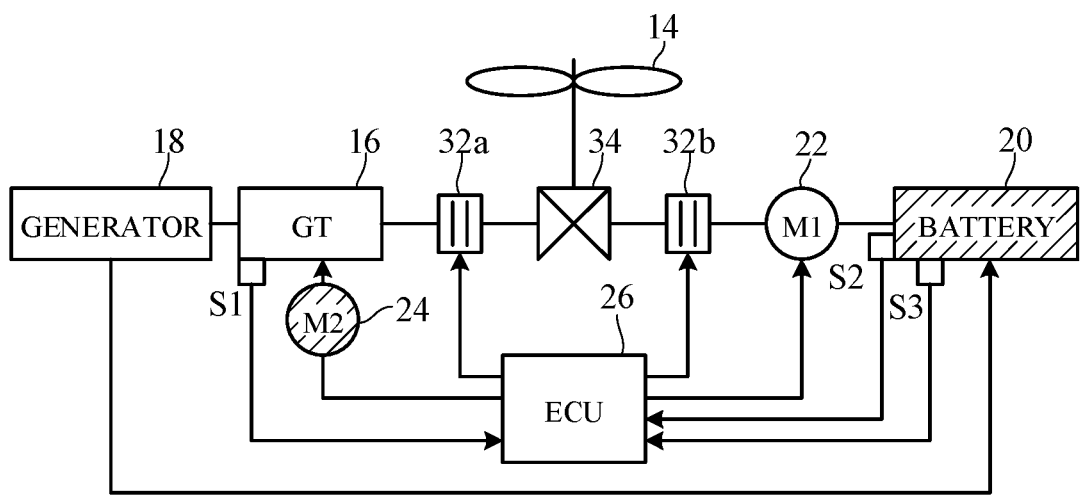
FIG. 8 is a block diagram, similar to FIG. 3, but showing processing of FIG. 6.

FIG. 3 is a block diagrams showing processing performed during parallel driving by the GT 16 and motors 22. FIG. 7 is a block diagram showing processing during series driving solely by the motors 22 in battery fully charged condition (S114), and FIG. 8 is a block diagram showing processing during motoring of the GT 16 by the second motor 24 after stopping the GT 16 (S110). In FIG. 3 (and other drawings), hatching of the battery 20 indicates, by size thereof, degree of residual (SOC), and hatching of other elements indicates their being in operation.

As indicated earlier, when residual (SOC) of the battery 20 is determined in S104 to be less than predetermined value SOCref, driving by the GT 16 is continued, as shown in FIG. 3, and driving by the motors 22 is also continued (S102). The rotors 14 are therefore driven by the GT 16 and the motors 22. The same also applies when failure of the battery 20 is detected in S100.

On the other hand, when residual (SOC) of the battery 20 is determined to be equal to or greater than predetermined value SOCref in S104 and exhaust gas temperature EGT of the GT 16 is determined to be lower than the predetermined temperature EGTref in S106, driving of the GT 16 is stopped as shown in FIG. 7 (S114 in FIG. 6). The rotors 14 are therefore driven by the motors 22. In this case, the GT 16 is not motored. The same applies when lubricant temperature Toil of the GT 16 exceeds the first specified temperature Toilref1.

In another case, namely when residual (SOC) of the battery 20 is equal to or greater than the predetermined value SOCref and engine temperature EGT of the GT 16 is equal to or higher than the predetermined temperature EGTref, the GT 16 is stopped and the second motor 24 is driven to motor the GT 16 as shown in FIG. 8 (S110 in FIG. 6). Specifically, this is, in addition to the above, a time period when lubricant temperature Toil of lubricating oil of the GT 16 is equal to or lower than the first specified temperature Toilref1.

Figure 9A:
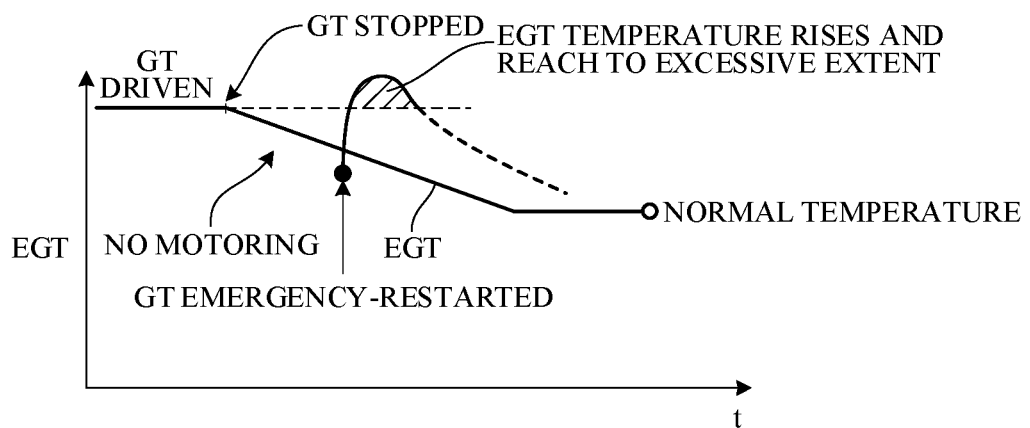
FIGS. 9A and 9B are a set of time charts illustrating effect of this embodiment.
Figure 9B:
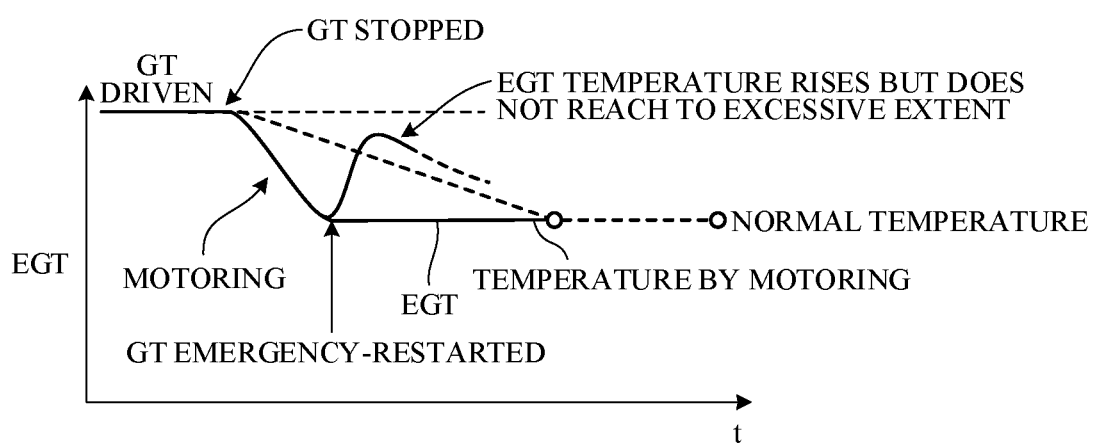

Moreover, also when residual (SOC) of the battery 20 is equal to or greater than predetermined value SOCref (affirmed in S104) but engine temperature EGT of the GT 16 is lower than the predetermined temperature EGTref (negative in S106), the GT 16 is stopped and the second motor 24 is driven to motor the GT16 (S110) when lubricant temperature Toil of the GT 16 is equal to or lower than second specified temperature Toilref2 (affirmative in S112). FIGS. 9A and 9B are a set of time charts illustrating effect of this embodiment.

As shown by time chart of FIG. 9A, in the case of conventional technology, emergency-restarting the GT 16 for some reason shortly after it was stopped leads to increased engine temperature EGT that is apt to degrade durability of stator vanes, moving vanes and the like at outlet of the combustion chamber 16c. And engine starting performance is likely to decline when lubricating oil viscosity deteriorates owing to the GT 16 engine being out of operation for a long time, especially when lubricant temperature falls low owing to icing over in winter.

However, in this embodiment configured as described in the foregoing, the GT 16 is motored by the second motor 24 after being stopped so as to continue intake of air through the air intake port 16a, thereby promoting reduction of engine temperature EGT, so that even if the GT 16 is emergency-restarted shortly after being stopped, its temperature is kept from rising excessively, as can be seen in time chart of FIG. 9B.

Moreover, even when the GT 16 is determined to be stopped, insofar as lubricant temperature Toil of the GT 16 is equal to or lower than the first or second specified temperature Toilref1 or Toilref2, the GT 16 is motored by the second motor 24 while stopped. The compressor 16b (and turbine 16d) are therefore driven despite no combustion in the combustion chamber 16c, whereby resulting inflow/outflow of lubricating oil ensures that the GT 16 does not sustain starting difficulty owing to deterioration of lubricating oil viscosity.

As described in the above, the embodiment is configured to have a hybrid flight vehicle (10) (and method for controlling the vehicle (10)), comprising: a frame (12); multiple rotors (14) attached to the frame and configured to produce propelling force to propel the frame; a gas turbine engine (GT 16) attached to the frame and configured to drive the rotors by combustion when fuel is supplied in a combustion chamber; a generator (18) connected to an output shaft (16d1) of the gas turbine engine and configured to generate electric power; a battery (20) configured to store the electrical power generated by the generator; multiple first electric motors (22; M1) each connected to the rotors to drive associated one of the rotors by the electric power supplied from the battery; a second electric motor (24, M2) connected to the output shaft of the gas turbine engine to motor (rotate) the gas turbine engine by the electric power supplied from the battery; an engine temperature detector (second temperature sensor 44, S1) configured to detect a temperature of the gas turbine engine; a battery residual detector (BMS 20a, S2) configured to detect a residual of the battery; and a control unit (electronic control unit (ECU) 26) configured to control flight by regulating driving of the multiple rotors by either or both of the first electric motors and the gas turbine engine; wherein the control unit stops supply of the fuel to the gas turbine engine when the residual of the battery detected by the battery residual detector is equal to or greater than a predetermined value (affirmative in S104, S110, S114), and supplies electric power to the second electric motor from the battery to motor the gas turbine engine when the temperature of the gas turbine engine detected by the engine temperature detector is equal to or higher than a predetermined temperature (affirmative in S106, S110). With this, the GT 16 is motored by the second motor 24 after being stopped so as to continue intake of air through the air intake port 16a, thereby promoting reduction of engine temperature EGT, so that even if the GT 16 is emergency-restarted shortly after being stopped, its temperature is kept from rising excessively.

In the hybrid flight vehicle (10) (and method), it is configured such that the control unit (ECU 26) detects failure of the battery (20), and continues supply of the fuel to the gas turbine engine (GT 16) even when failure of the battery is detected (affirmative in S100, S102). With this, in addition to the advantages and effects mentioned above, it becomes possible to enhance flight safety even when the battery 20 fails.

In the hybrid flight vehicle (10) (and method), it further includes: a lubricant temperature detector (third temperature sensor 46) configured to detect a temperature of lubricant of the gas turbine engine (GT 16); and it is configured such that the control unit supplies electric power to the second electric motor (24) from the battery to motor the gas turbine engine when the temperature of the lubricant of the gas turbine engine detected by the lubricant temperature detector is equal to or lower than a predetermined temperature (affirmative in S108, affirmative in S112; S110). With this, in addition to the advantages and effects mentioned above, the compressor 16b (and turbine 16d) are therefore driven despite no combustion in the combustion chamber 16c, whereby resulting inflow/outflow of lubricating oil ensures that the GT 16 does not sustain starting difficulty owing to deterioration of lubricating oil viscosity.

In the hybrid flight vehicle (10) (and method), it is configured such that the control unit stops supply of the fuel to the gas turbine engine (GT 16) when the temperature of the gas turbine engine detected by the engine temperature detector is less than the predetermined temperature, insofar as the residual of the battery detected from the battery residual detector is equal to or greater than the predetermined value (affirmative in S104, negative in S106, S110, S114). With this, in addition to the advantages and effects mentioned above, it becomes possible to improve fuel efficiency.

In the hybrid flight vehicle (10) (and method), it further includes: a lubricant temperature detector (third temperature sensor 46) configured to detect a temperature of lubricant of the gas turbine engine (GT 16); and it is configured such that control unit supplies electric power to the second electric motor (24) from the battery to motor the gas turbine engine (GT 16) if the temperature of the lubricant of the gas turbine engine detected by the lubricant temperature detector is equal to or lower than a predetermined temperature when the temperature of the gas turbine engine detected by the engine temperature detector is less than the predetermined temperature (negative in S106, affirmative in S108, S112). With this, in addition to the advantages and effects, resulting inflow/outflow of lubricating oil ensures that the GT 16 does not sustain starting difficulty owing to deterioration of lubricating oil viscosity.

In the hybrid flight vehicle (10) (and method), it is configured such that the control unit stops supply of the electric power to the second electric motor (24), more specifically, it does not supply the electric power to the second electric motor (24) when the temperature of the lubricant of the gas turbine engine detected by the lubricant temperature detector exceed the predetermined temperature (negative in S108 and S112, S114). With this, in addition to the advantages and effects, this ensures that the GT 16 does not sustain starting difficulty as there is deterioration of lubricating oil viscosity.

It should be noted in that above that any or all of the generator 18, first and second electric motors 22, 24 can be a motor generator.

While the present invention has been described with reference to the preferred embodiments thereof, it will be understood, by those skilled in the art, that various changes and modifications may be made without departing from the scope of the appended claims.

What is claimed is:

1. A hybrid flight vehicle, comprising:
a frame;
multiple rotors attached to the frame and configured to produce propelling force to propel the frame;
a gas turbine engine attached to the frame and configured to drive the rotors by combustion when fuel is supplied in a combustion chamber;
a generator connected to an output shaft of the gas turbine engine and configured to generate electric power;
a battery configured to store the electrical power generated by the generator;
multiple first electric motors each connected to the rotors to drive associated one of the rotors by the electric power supplied from the battery;
a second electric motor connected to the output shaft of the gas turbine engine to motor the gas turbine engine by the electric power supplied from the battery;
an engine temperature detector configured to detect a temperature of the gas turbine engine;
a lubricant temperature detector configured to detect a temperature of lubricant of the gas turbine engine;
a battery residual detector configured to detect a residual of the battery; and
a control unit configured to control flight by regulating driving of the multiple rotors by either or both of the first electric motors and the gas turbine engine;
wherein the control unit stops supply of the fuel to the gas turbine engine when the residual of the battery detected by the battery residual detector is equal to or greater than a predetermined value, and supplies electric power to the second electric motor from the battery to motor the gas turbine engine while stopping supply of the fuel to the gas turbine engine when the temperature of the gas turbine engine detected by the engine temperature detector is equal to or higher than a predetermined temperature, and when the temperature of the lubricant of the gas turbine engine is equal to or lower than a predetermined lubricant temperature.

2. The vehicle according to claim 1, wherein the control unit detects failure of the battery, and continues supply of the fuel to the gas turbine engine if failure of the battery is detected.

3. The vehicle according to claim 1, wherein the control unit stops supply of the fuel to the gas turbine engine when the temperature of the gas turbine engine is less than the predetermined temperature, insofar as the residual of the battery detected from the battery residual detector is equal to or greater than the predetermined value.

4. The vehicle according to claim 3,
wherein the control unit supplies electric power to the second electric motor from the battery to motor the gas turbine engine while stopping supply of the fuel to the gas turbine engine if the temperature of the lubricant of the gas turbine engine is equal to or lower than a predetermined lubricant temperature when the temperature of the gas turbine engine detected by the engine temperature detector is less than the predetermined temperature.

5. The vehicle according to claim 4, wherein the control unit stops supply of the electric power to the second electric motor while stopping supply of the fuel to the gas turbine engine when the temperature of the lubricant of the gas turbine engine exceeds the predetermined lubricant temperature.

6. A hybrid flight vehicle, comprising:
a frame;
multiple rotors attached to the frame and configured to produce propelling force to propel the frame;
a gas turbine engine attached to the frame and configured to drive the rotors by combustion when fuel is supplied in a combustion chamber;
a generator connected to an output shaft of the gas turbine engine and configured to generate electric power;
a battery configured to store the electrical power generated by the generator;
multiple first electric motors each connected to the rotors to drive associated one of the rotors by the electric power supplied from the battery;
a second electric motor connected to the output shaft of the gas turbine engine to motor the gas turbine engine by the electric power supplied from the battery;
an engine temperature detector configured to detect a temperature of the gas turbine engine;
a lubricant temperature detector configured to detect a temperature of lubricant of the gas turbine engine;
a battery residual detector configured to detect a residual of the battery; and
an electronic control unit constituted of a microcomputer equipped with at least one processor and at least one memory coupled to the processor, the processor being configured to control flight by regulating driving of the multiple rotors by either or both of the first electric motors and the gas turbine engine;
wherein the processor is configured to stop supply of the fuel to the gas turbine engine when the residual of the battery detected by the battery residual detector is equal to or greater than a predetermined value, and supply electric power to the second electric motor from the battery to motor the gas turbine engine while stopping supply of the fuel to the gas turbine engine when the temperature of the gas turbine engine detected by the engine temperature detector is equal to or higher than a predetermined temperature, and when the temperature of the lubricant of the gas turbine engine is equal to or lower than a predetermined lubricant temperature.

7. The vehicle according to claim 6, wherein the processor is configured to detect failure of the battery, and continue supply of the fuel to the gas turbine engine if failure of the battery is detected.

8. The vehicle according to claim 6, wherein the processor is configured to stop supply of the fuel to the gas turbine engine when the temperature of the gas turbine engine is less than the predetermined temperature, insofar as the residual of the battery detected from the battery residual detector is equal to or greater than the predetermined value.

9. The vehicle according to claim 8,
wherein the processor is configured to supply electric power to the second electric motor from the battery to motor the gas turbine engine while stopping supply of the fuel to the gas turbine engine if the temperature of the lubricant of the gas turbine engine is equal to or lower than a predetermined lubricant temperature when the temperature of the gas turbine engine detected by the engine temperature detector is less than the predetermined temperature.

10. The vehicle according to claim 9, wherein the processor is configured to stop supply of the electric power to the second electric motor while stopping supply of the fuel to the gas turbine engine when the temperature of the lubricant of the gas turbine engine exceeds the predetermined lubricant temperature.

* * * * *